United States Patent
van der Lely et al.

[15] 3,682,395
[45] Aug. 8, 1972

[54] SPREADING IMPLEMENTS WITH MEANS FOR VARYING AND DIRECTING THE FLOW OF MATERIALS

[72] Inventors: Ary van der Lely, 10, Weverskade, Maasland; Cornelis Johannes Gerardus Bom, 36 Esdoornlaam, Rosenburg, both of Netherlands

[22] Filed: March 5, 1970

[21] Appl. No.: 16,732

[30] Foreign Application Priority Data

March 11, 1969 Netherlands..............6903709

[52] U.S. Cl. ...................239/666, 239/665, 239/687
[51] Int. Cl..............................................A01c 17/00
[58] Field of Search......239/665, 687, 688, 689, 666

[56] References Cited

UNITED STATES PATENTS

| | | | |
|---|---|---|---|
| 3,013,803 | 12/1961 | Piester | 239/665 X |
| 3,109,657 | 11/1963 | Dreyer | 239/665 |
| 2,489,171 | 11/1949 | Balouf | 239/687 X |
| 1,312,226 | 8/1919 | Bangert | 239/665 X |
| 2,956,810 | 10/1960 | Voich et al. | 239/666 |

*Primary Examiner*—M. Henson Wood, Jr.
*Assistant Examiner*—John J. Love
*Attorney*—Mason, Mason & Albright

[57] ABSTRACT

A spreading implement includes at least one rotary spreading member beneath a hopper on a transportable frame with drive means connected to the rotary member. A guide is positioned adjacent the spreading member to arrest the kinetic energy imparted to material ejected and to allow the material to fall by gravity to the ground. The guide can be a screen with a configuration that varies the distance between the screen's surface and the spreading member. Thus, the distance between a segment of the screen and the spreading member can progressively decrease about the axis of rotation in the direction of rotation. The outlet in the bottom of the hopper can be positioned to feed material to the spreading member so that regulated amounts strike the screen. Such a screen can have foldable sections that are positionally adjustable to permit spreading spectrum changes. One or more spreading members with outlet regulators can be pivoted on beams relative to a frame mount so that insecticides, herbicides and the like can be directed in carefully controlled amounts along rows of trees or other crops.

36 Claims, 8 Drawing Figures

INVENTORS
ARY VAN DER LELY
CORNELIS JOHANNES GERARDUS BOM

SPREADING IMPLEMENTS WITH MEANS FOR VARYING AND DIRECTING THE FLOW OF MATERIALS

An object of the invention is the provision of an implement of the kind specified above which is capable of distributing small quantities per unit area of materials, such as herbicides, simply and effectively around trees, shrubs and the like standing in rows.

According to one aspect of the invention, there is provided a spreading implement of the kind set forth, wherein the implement includes means to remove kinetic energy from material ejected by the spreading member during the use of the implement, said means being located at a short distance from the spreading member which is such that, after being subject to the action of said means, gravity is substantially the only force acting upon the material.

For a better understanding of the invention, and to show how the same may be carried into effect, reference will now be made, by way of example, to the accompanying drawings, in which:

Figure 1:
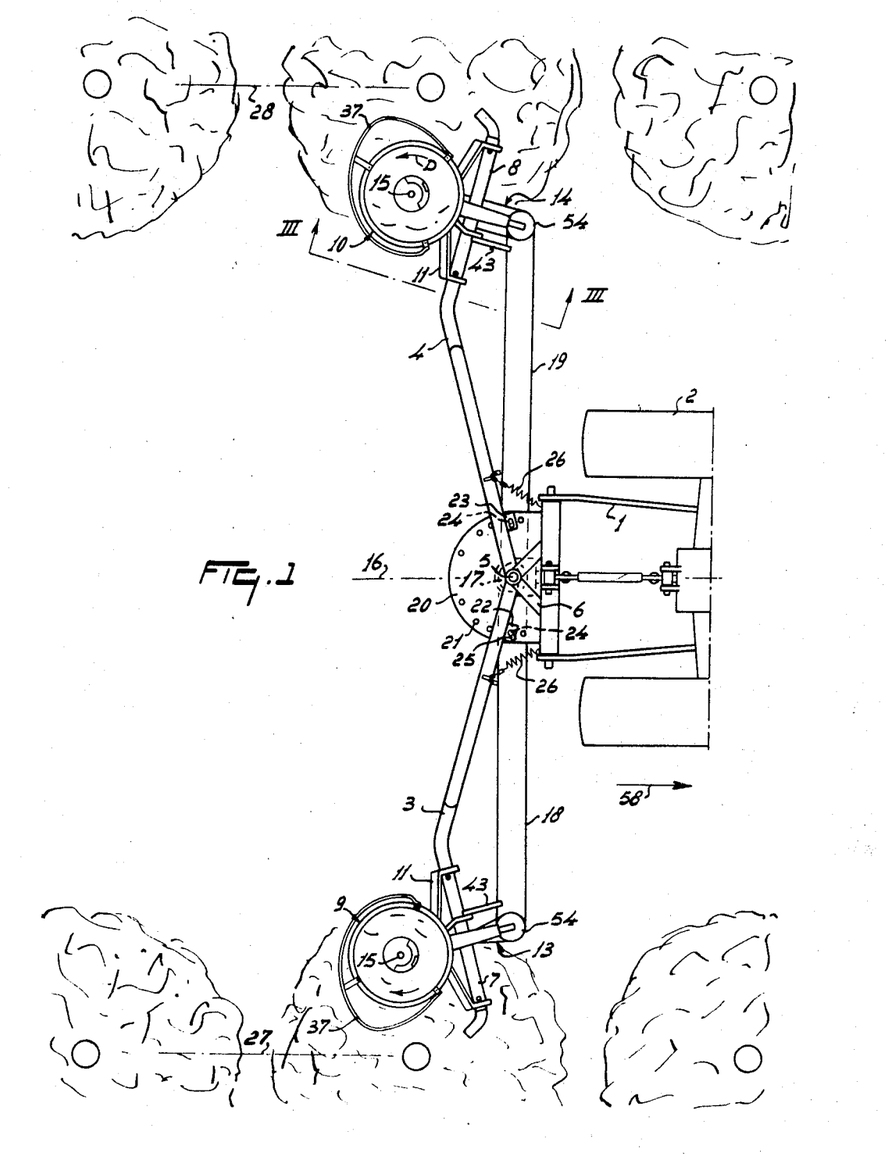
FIG. 1 is a plan view illustrating the operation of a dual spreading implement in accordance with the invention, the implement being connected to the three-point lifting device or hitch of a tractor.

Referring to FIG. 1 of the drawings, the spreading or distributing implement which is illustrated in that Figure is a dual implement intended principally for distributing powdered and granular materials, such as herbicides, between trees, shrubs and other plants that stand in rows in orchards, fields and the like. An operating tractor 2 has a three-point lifting device or hitch 1 and two oppositely directed frame beams 3 and 4 are turnably about a central substantially vertical pivot 5 carried by a supporting structure 6 that is mounted on the three-point lifting device 1 in a generally conventional manner. The two frame beams 3 and 4 are of tubular construction and the ends 7 and 8 thereof that are remote from the central pivot 5 respectively carry the two spreading portions 9 and 10 of the dual implement. The ends 7 and 8 of the beams 3 and 4 are of solid formation and square cross-section (see FIG. 3) and each of the two spreading portions 9 and 10 is connected thereto by supporting arms 11 and substantially vertical retaining pins or the like 12.

Figure 2:
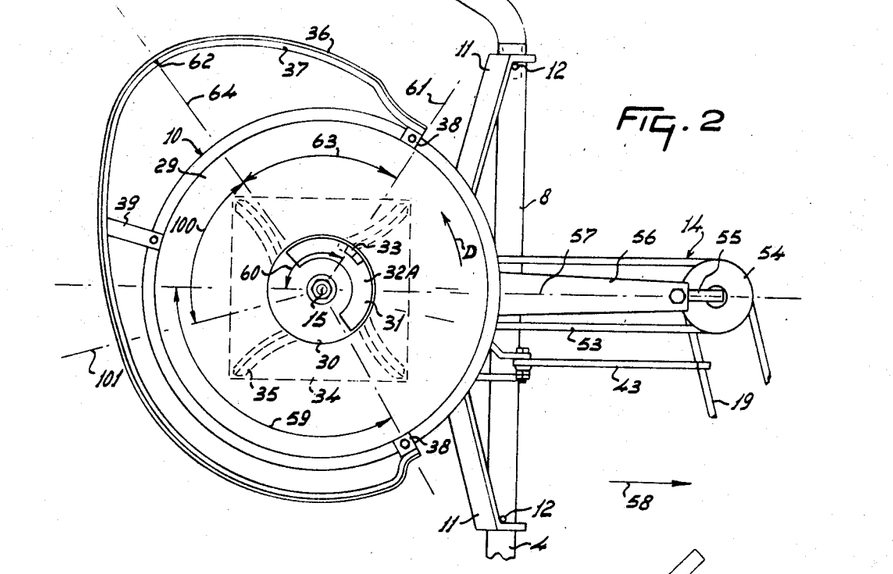
FIG. 2 is a plan view, to an enlarged scale, showing further details of one of the two implements illustrated in FIG. 1.
Figure 3:
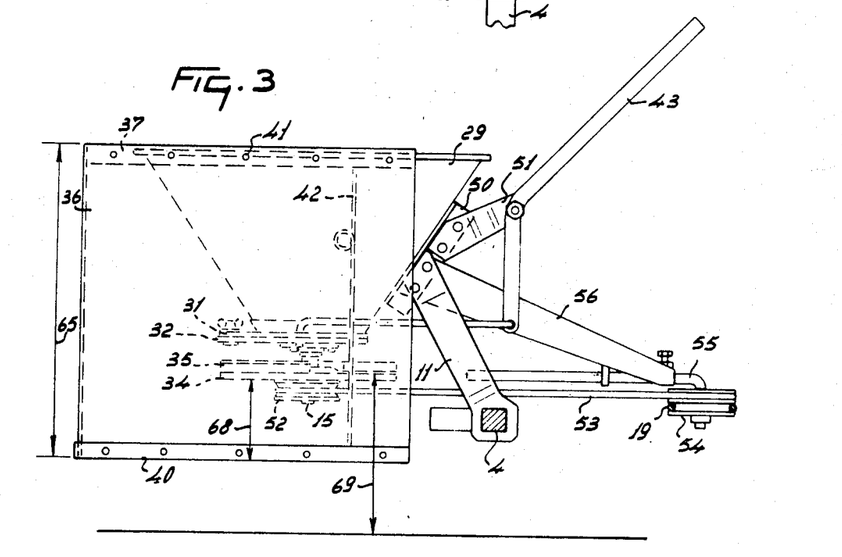
FIG. 3 is a section, to an enlarged scale, taken on the line III—III of FIG. 1.

The spreading portions 9 and 10 have corresponding driving mechanisms 13 and 14 respectively with the aid of each of which mechanisms central substantially vertical driving shafts 15 of the two portions 9 and 10 can be rotated. A double pulley 17 (FIG. 1) is rotatable about a substantially vertical axis coincident with that of the central pivot 5 and is driven from the power take-off shaft of the tractor 2 with the aid of a simple mechanism which is not illustrated in the drawings. V-belts, ropes or the like 18 and 19 pass around the two pulleys 17 and are directed laterally in relatively opposite directions towards the ends 7 and 8 of the two beams 3 and 4. As can be seen in FIGS. 2 and 3 of the drawings in respect of the driving mechanism 14, the V-belt, rope or the like 19 passes around one pulley of a double pulley 54 from the other pulley of which a V-belt, rope or the like 53 transmits the drive to the corresponding shaft 15 by way of a pulley 52 that is secured to the lowermost end of that shaft. The driving mechanism 13 is symmetrically similar except that the V-belt, rope or the like which corresponds to the belt or rope 53 is "crossed" (see FIG. 1) to ensure that the two shafts 15 rotate in opposite directions.

The supporting structure 6 includes a large control disc 20 that is substantially horizontally disposed and that has a curved edge whose center of curvature is coincident with the axis of the central pivot 5. A number of holes 21 are formed through the disc 20 around the curved edge and those parts of the two arms 3 and 4 which are turnable around the pivot 5 over the edge region of the disc 20 carry blocks 22 and 23 respectively through which substantially vertical holes 24 are formed. The arms 3 and 4 can be turned around the central pivot 5 until the holes 24 come into register with chosen ones of the holes 21. Vertical locking pins 25 can then be entered through the aligned holes to retain the arms 3 and 4 in the chosen angular settings around the pivot 5. The working width of the dual implement can thus be varied. A maximum working width in which the two spreading portions 9 and 10 are at a maximum distance apart from one another is obtained by entering the locking pins 25 through the holes 24 and those holes 21 in the disc 20 which are furthest remote from one another. The maximum working width which has just been mentioned is advantageously about 6 meters. The dual implement can be placed in a position suitable for the non-operative transport thereof in which its width is reduced to a minimum. This position is reached by turning the two frame beams 3 and 4 towards one another about the central pivot 5 until the holes 24 are in register with the two holes 21 that are located closest to the opposite sides of a central substantially vertical plane of symmetry 16 of the implement that extends parallel to the intended direction of operative travel 58 (FIG. 1) thereof. Simple and safe transport of the implement is thus possible. Helical tension springs 26 extend between the frame beams 3 and 4 and parts of the supporting structure 6 and the blocks 22 and 23 may, if desired, be omitted so that the springs 26 hold the beams 3 and 4 against stops while allowing said beams to yield rearwardly about the central pivot 5 upon meeting immovable obstacles. To this end, the springs 26 are provided with known mechanisms (not shown) to enable them to be stretched as required. Either by using the blocks 22 and 23 or by using the springs 26 in combination with stops, the working width of the dual implement can readily be adjusted to match the different spacings between rows 27 and 28 of trees, shrubs and the like.

The two spreading portions 9 and 10 are symmetrically identical apart from the previously mentioned dispositions of the belts, ropes or the like 53 of the two driving mechanisms 13 and 14. The spreading portion 10 which is shown in greater detail in FIGS. 2 and 3 of the drawings has a container in the form of a hopper 29 of inverted frusto-conical configuration. A rotary spreading member 34 is disposed beneath the bottom of the hopper 29 and takes the form of a square disc provided with four curved spreading blades 35 on its upper surface, the radially outermost ends of the blades 35 being located at the four corners of the square disc. The center of the spreading member 34 is, of course, secured to the driving shaft 15 above the pulley 52, said shaft being rotatably journalled in a substantially vertical bearing (not visible in the drawings) carried by the bottom 30 of the hopper 29. Beneath the hopper bottom 30, upper and lower discs 31 and 32 are turnable relative to one another about the shaft 15 and are also turnable, in common, about that shaft. Means is provided for securing the discs 31 and 32 in chosen angular settings about the shaft 15 and a control arm 43 that projects forwardly is provided for varying the angular setting as may be required. The bottom 30 of the hopper 29 has a semi-circular outlet port 32A and the two underlying discs 31 and 32 are provided with outlet openings 33 that are of substantially rectangular configuration in this particular embodiment. The relative angular settings of the two discs 31 and 32 determine the degree of overlap, or otherwise, of the openings 33 and thus the effective size of the port through which material from the hopper 29 can reach the spreading member 34. The angular setting of this effective opening around the shaft 15 is the principal factor in determining the direction in which the spreading member 34 ejects the material from the spreading portion 10. Each opening 33 preferably has an area which is not greater than 5 square centimeters and each opening preferably has a maximum radial width of not more than 1 centimeter.

A strip-like fastening bracket 50 is secured to the inclined wall of the hopper 29 at the front thereof relative to the direction 58. A support 51 is bolted to the bracket 50 and the previously mentioned control arm 43 is turnable about a pivot bolt mounted at the free end of the support 51. The upper ends of the supporting arms 11 by which the hopper 29 is fastened to the frame beam 4 are also bolted to the bracket 50 below the support 51. The previously mentioned double pulley 54 of the driving mechanism 14 is rotatably mounted at the leading downwardly bent-over end of a rod 55 whose main horizontal limb is of square cross-section. The horizontal limb of the rod 55 is carried at the leading end of a support 56 which projects forwardly and downwardly from the bracket 50 to which latter it is bolted by the same bolts as are used in respect of the supporting arms 11. The arrangement is, in fact, such that a vertical set bolt having a lock nut provided at the leading end of the support 56 can be employed to retain the rod 55 in a chosen setting of extension beyond the support 56 in the direction 58. The V-belt, rope or the like 53 can thus be tensioned as required.

The uppermost edge of the hopper 29 has a guide screen 36 connected to it. A rail-like bracket 37 has its opposite ends secured to the uppermost edge of the hopper 29 by short strips 38 while an approximately central region thereof is connected to the uppermost edge by a longer strip 39. The uppermost edge of the substantially vertically disposed guide screen 36 is itself secured to the bracket 37 by small bolts or rivets 41. The guide screen 36 is preferably formed wholly or partly from a material that is capable of absorbing a large proportion of the kinetic energy of any moving article which strikes it. Materials such as, for example, foam rubber, polyurethane foam or some other foamed synthetic plastics material has been found to be suitable. As will be evident from FIG. 2 of the drawings, the bracket 37, and therefore the guide screen 36, is not symmetrical with respect to the opposite sides of a substantially vertical plane 57 containing the axis of rotation of the shaft 15 and extending parallel to the direction 58. That portion of the screen 36 which is to the right-hand side of the plane 57 with respect to the direction 58 is cylindrically curved in such a way that the center of curvature is substantially coincident with the longitudinal axis of the shaft 15, said portion subtending an angle 59 of about 120° at said shaft. The portion of the guide screen 36 which is located at the left-hand side of the plane 57 with respect to the direction 58 is irregularly curved but nevertheless subtends an angle 60 at the axis of the shaft 15 which also has a magnitude of about 120°. FIG. 2 of the drawings shows, in plan, a line 61 extending radially from the shaft 15 through that end of the bracket 37 which is to the left-hand side of the plane 57 with respect to the direction 58. It will be noted that the line 61 intersects, in plan view, the outlet openings 33. That point on the bracket 37 and guide screen 36 which, in the plan view of FIG. 2, is furthest from the shaft 15 is denoted by the reference 62 and it will be noted that the angle 63 which is enclosed between the radial line 61 and a radial line 64 (extending from the shaft 15 through the point 62) has a magnitude of about 70°. The point 62 is located at a perpendicular distance from the shaft 15 which is preferably not less than about twice the perpendicular distance between that shaft and the radially outermost end of any one of the spreading blades 35. Conversely, it is preferred that the first of the two distances just mentioned should not exceed four times the second of those distances. The distance preferably has a value of between 20 and 50 centimeters and, in the particular embodiment, which is being described, the point 62 is spaced along the line 64 from the shaft 15 by a distance which is about 2 ½ times the perpendicular distance between the shaft 15 and the radially outermost end of one of the spreading blades 35. The point 62 is located on that side of the plane 61 to which, in the plan view of FIG. 2, the disc of the spreading member 34 is turning by intersecting the vertical plane 61. It will be noted that, while the irregularly curved portion of the guide screen 36 associated with the point 62 is located to the left-hand side of the plane 57 (with respect to the direction 58) in the case of the spreading portion 10 (FIG. 2), the corresponding irregularly curved portion of the screen 36 and bracket 37 is located to the right-hand side of a corresponding plane in the case of the spreading portion 9 (FIG. 1).

As can be seen in FIG. 3 of the drawings, the lowermost edge of the guide screen 36 is secured to a bracket 40 that is somewhat similar to the bracket 37, further small bolts or rivets 41 being employed to this end. However, it is preferred that the bracket 40 should be heavy in weight so that the flexible screen 36 will hang more or less vertically in a taut condition during operation of the implement. It is also preferred that a compression spring or coil spring 42 (FIG. 3) should extend between the two brackets 37 and 40 to tend to maintain those brackets in a vertically spaced apart condition and thus keep the material of the screen 36 itself in a taut or stretched condition. The spring 42 should be arranged in such a way that lateral and rearward yielding movements of the lower bracket 40 remain possible despite the taut condition of the screen 36.

In the use of the dual implement which has been described, each hopper 29 is filled with the herbicide or other powdered or granular material that is to be spread and the power take-off shaft of the tractor 2 is driven to rotate the spreading member 34 of the spreading portion 10 in the direction D (FIGS. 1 and 2) and the spreading member 34 of the spreading portion 9 in an opposite direction (see FIG. 1). The outlet openings 33 are adjusted relative to each other and in common relative to the outlet port 32A so that the desired quantity of material per unit time flows from each hopper 29 to each spreading member 34. The shapes and dimensions of the outlet ports and openings are such that the implement is capable of distributing quantities of herbicides and like materials of about 80 kilograms per hectare (71.25 pounds per acre). The sizes of the effective outlet ports through the hopper bottoms 30 will, of course, be adjusted to suit the speed of travel of the implement.

The rapid rotation of each spreading member disc 34 causes the powdered or granular material which falls thereon to be spread centrifugally by the blades 35 in a direction such that almost all of that material strikes the screens 36. The kinetic energy of the material is absorbed by the screens 36 and its velocity in a horizontal direction relative to the screens is thus reduced substantially to zero. Gravity remains as the only strong force tending to move the material and the material thus drops downwardly along the screens 36. In order to ensure that all, or a very large proportion, of the material strikes the screens 36 and is guided downwardly thereby as required, each screen 36 has a large vertical extent 65 (FIG. 3) downwardly from the uppermost edge of the corresponding hopper 29, part of each screen 36 extending below the corresponding spreading member 34 throughout a vertical distance 68. Although it is preferred to employ the heavy lower brackets 40 to ensure that the screens 36 remain more or less vertically disposed, it is not absolutely essential to employ these brackets when the screens 36 are made from, or include, materials which are of sufficient rigidity in themselves.

Figure 4:
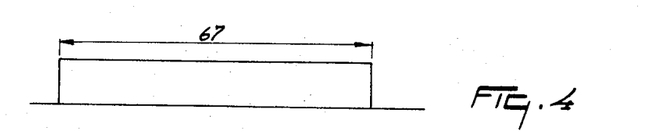
FIG. 4 is a diagram illustrating a distribution spectrum of the implement, FIG. 5 corresponds to FIG. 2 but shows the implement provided with an alternative part.

It will be appreciated that the guide screens 36 are detachable from the spreading portions 9 and 10 but, when they are employed, a distribution spectrum for the spread material similar to that shown in FIG. 4 is produced, the material being spread throughout a sharply defined width 67 which depends upon the angular setting of the open outlet around the corresponding shaft 15. The position of the screen 36 itself around the shaft 15 also effects the magnitude of the width 67.

The spreading implement which is illustrated in the drawings by way of example is arranged for distributing herbicides and like materials in the form of small granules, crystals and other similar particles. The screens 36 are disposed to suit the spreading of such materials and the aforementioned vertical distance 68 is approximately half the vertical distance 69 between the spreading member 34 and the ground surface. The implement is particularly suitable for spreading herbicides, insecticides and other pesticides in granular, powdered, crystalline or other particulate forms since such materials generally need to be distributed very uniformly at small weights per unit area such as about 80 kilograms per hectare (71.25 pounds per acre). With such rates of distribution, only about 3 or 4 average grains of the material should fall upon each square centimeter of ground. The screens 36 are effective in producing uniform distributions of this order and, when arranged as shown in FIGS. 1 to 3 of the drawings, keep the material strictly within the sharply defined width 67 indicated in FIG. 4.

The screens 36 should be moved in position in dependence upon the angular setting of the outlet openings 33 around the shafts 15 and their distances from the planes 57. If alteration of the position of the discs 31 and 32 about the axes of the shafts 15 is found to be necessary, then it is most desirable that the screens 36 should also be moved around those axes. The angular displacement of the screens 36 should be substantially equal to the common displacement of the discs 31 and 32. The shapes and positions of the screens 36 are such that the herbicide or other material strikes them along lines of impact making angles of 90°, or substantially 90°, with tangents to their surfaces at the actual points of impact. When the spreading portion 10 is arranged as shown in FIGS. 1, 2 and 3 of the drawings, the material ejected by the spreading member 34 strikes the screen 36 throughout an area subtending an angle 100 of about 65° at the axis of the corresponding shaft 15. As can be seen in FIG. 2 of the drawings, a part of this area subtending an angle of about 15° at the shaft 15 is located to the right-hand side of the plane 57 with respect to the direction 58 whereas a part thereof subtending about 50° at the shaft 15 is located on the opposite side of said plane. The position of the area subtending the angle 100, its size, the speed of rotation of the spreading member 34 and the angular setting of the outlet openings 33 about the shaft 15 are all interdependent. The desired distribution spectrum is obtained by arranging each screen 36 at a short distance from the corresponding spreading member 34 and it will be noted that the outermost point 62 of the screen 36 of the spreading portion 10 is located on the radial line 64 and that the aforementioned angle 100 is enclosed between said line 64 and a further radial line 101. With respect to the intended direction of rotation D of the spreading member 34, the point 62 is in line with the leading boundary 64 of the angle 100 and the radial distance of the screen 36 and bracket 37 from the shaft 15 progressively decreases towards the boundary line 101 of the angle 100 as a blade 35 passes through the angle 100 in the direction D. The perpendicular distance between the screen 36 and the shaft 15 is at about its minimum value at the point at which said screen is intersected (in the plan view of FIG. 2) by the radial line 101 disregarding the two ends of the screen at which the bracket 37 is fixed to the strips 38. Provided that at least the concave surface of each screen 36 against which the material strikes is formed from an energy-absorbent composition, there will be very little, if any, tendency for the impacting material to bounce substantially horizontally away from the screens. The material thus drops more or less vertically downwards after impact so that the screens 36 themselves sharply define the distribution area. To this end, it is desirable, although not absolutely essential, that the impact trajectories of the particles of material should be as nearly perpendicular as possible to tangents to the surface of the screens 36 at the individual points of impact. It is noted once again that the operation of the spreading portion 9 is substantially symmetrically identical to that of the spreading portion 10 shown in detail in FIGS. 2 and 3 of the drawings. It is also noted that, while it is convenient and economic to form a spreading implement in accordance with the invention as a dual implement in the manner illustrated in FIG. 1 of the drawings, this is by no means essential and it is within the scope of the invention to provide a "single" implement that projects only to the left, or only to the right, of the plane 16 shown in FIG. 1.

Figure 5:
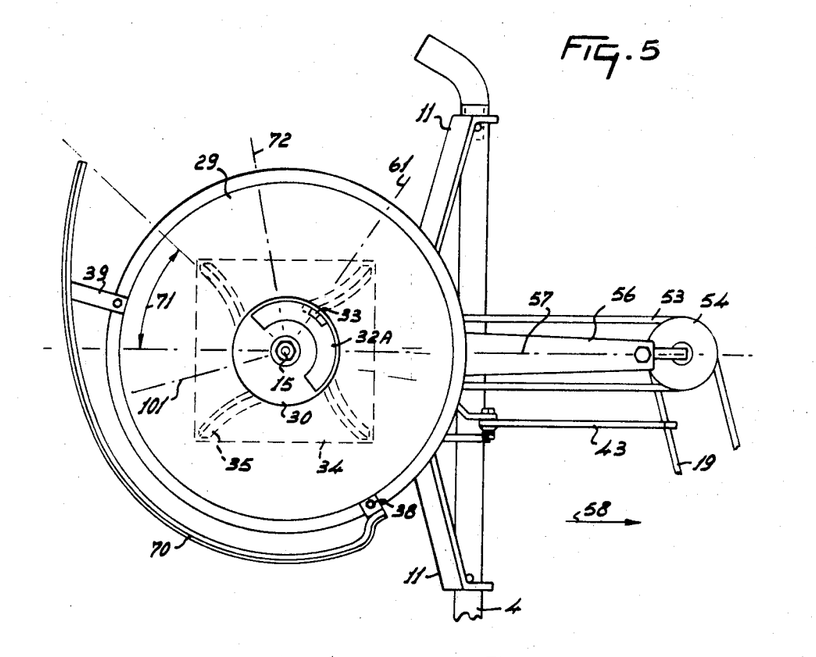
Figure 6:
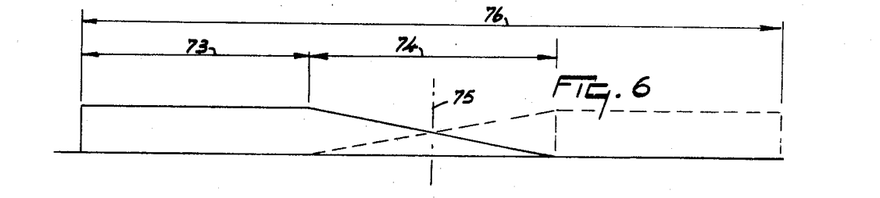
FIG. 6 is a diagram illustrating the distribution spectrum which is obtained when the implement is provided with the alternative part illustrated in FIG. 5, FIG. 7 again generally corresponds to FIG. 2 but shows a further alternative part, and FIG. 8 once again corresponds to FIG. 2 but shows a still further alternative part.
Figure 7:
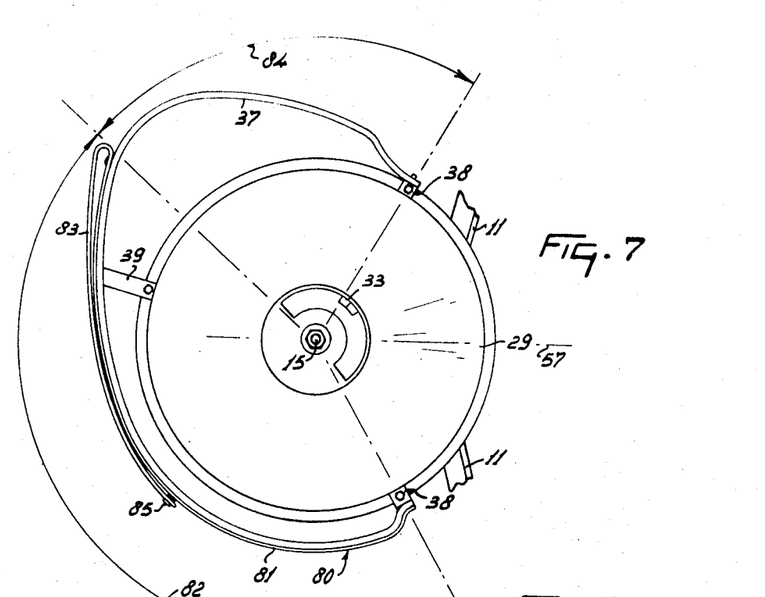
Figure 8:
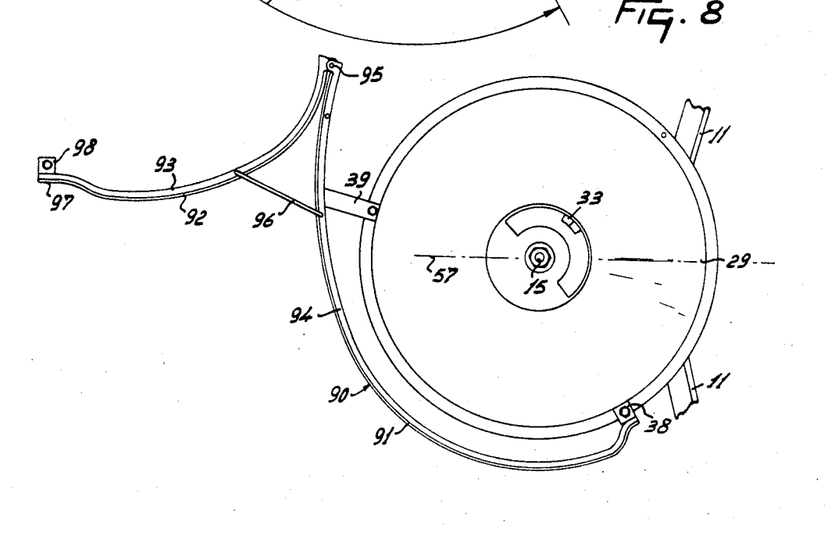

FIG. 5 of the drawings substantially corresponds to FIG. 2 but illustrates the provision of a guide screen 70 that is of a different construction to the previously described guide screen 36. Parts that are similar, or identical, to parts that have already been described are indicated in FIG. 5 (and in FIGS. 7 and 8) of the drawings by the same reference numerals as are employed for those parts in FIGS. 1 to 3 of the drawings. It will be noted that the outlet openings 33 are shown in FIG. 5 of the drawings occupying the same positions as illustrated in FIG. 2. That part of the guide screen 70 which is located to the right of the plane 57 with respect to the direction 58 has substantially the same shape and disposition as the corresponding part of the guide screen 36 of the spreading portion 10 in the embodiment of FIGS. 1 to 3. However, that part of the guide screen 70 which is located to the left of the plane 57 with respect to the direction 58 is much smaller than the corresponding part of the guide screen 36 and subtends an angle 71 of only about 40° magnitude at the axis of the shaft 15. Nevertheless, the part of the screen 70 which subtends the angle 71 has the same shape and disposition as the corresponding region of the screen 36. With the discs 31 and 32 adjusted to position the outlet openings 33 as illustrated in FIG. 5, material is spread from the member 34 by the blades 35 substantially only throughout a sector bounded, in plan view, at one end by a radial line 72 and at the opposite end by the previously mentioned radial line 101. The screen 70 registers with only part of this sector so that material leaving the spreading member 34 through an angular sector around the axis of the shaft 15 that is bounded by the line 72 and by a line passing through the free outermost end of the screen 70 does not strike that screen at all and is therefore not prevented from moving further outwards away from the spreading member 34.

When materials such as herbicides in the form of small granules, crystals or other particles are to be spread by the implement, the guide screen 70 provides a distribution spectrum similar to that shown diagrammatically in FIG. 6. The herbicide, insecticide or other pesticide is substantially evenly distributed throughout a width 73 measured in a substantially horizontal direction perpendicular to the direction 58 whereas the weight of material which reaches the ground per unit area progressively decreases over a width 74 extending outwardly away from the plane 57. The distribution spectrum shown in FIG. 6 is very effective for treating rows of trees, shrubs or the like with herbicides, insecticides and the like and, in FIG. 6 of the drawings, the position of the row is diagrammatically illustrated by the broken vertical line 75. If an implement similar to the single implement of FIG. 5 passes the row indicated by the line 75 at the opposite side thereof to the first pass and in an opposite direction to the direction 58, then a second symmetrical distribution spectrum shown in FIG. 6 in broken lines is obtained. By operating in this way, an overall distribution width 76 is obtained that extends equal distances to the opposite sides of the row indicated by the line 75. The amount of herbicide or the like which is spread per unit area of ground is substantially uniform throughout the distribution width 76 except for a slight reduction immediately around the trees or shrubs affording the row indicated by the line 75.

FIG. 7 shows a further alternative construction in which the guide screen 36 of FIG. 2 is replaced by a guide screen that is generally indicated by the reference 80. The guide screen 80 has the same shape as the guide screen 36 and comprises a portion 81 subtending an angle 82 at the axis of the shaft 15 which is equal to the angle subtended by the guide screen 70 of FIG. 5. However, the guide screen 80 has a second portion 83 which can either occupy a position in which it subtends an angle 84 at the axis of the shaft 15 or a folded-back position (as illustrated) in which it is disposed behind the portion 81 when viewed from the shaft 15. Buttons or other known releasable fastenings 85 are employed to maintain the portion 83 in the ineffective folded-back position shown in FIG. 7 of the drawings and at least one of said buttons or the like 85 may be employed to connect the free end of the portion 83 to the short strip 38 at the upper right of FIG. 7 of the drawings when said portion 83 occupies its operative position. It will be realized from the preceding description that, when the portion 83 of the guide screen 80 occupies its operative position, a distribution spectrum similar to that shown in FIG. 4 of the drawings will be obtained whereas, when it occupies its inoperative position, as illustrated in FIG. 7, a distribution spectrum similar to that described with reference to FIG. 6 of the drawings will be obtained.

FIG. 8 of the drawings shows a still further alternative construction in which a guide screen 90 is provided having a substantially fixed portion 91 that corresponds to the portion 81 described with reference to FIG. 7. In this case, the bracket 37 is replaced by a bracket having a fixed portion 94 and a pivotable portion 93, the latter portion 93 being turnable relative to the fixed portion about a substantially vertical pivot 95. The pivotable portion 93 of the bracket carries a movable portion 92 of the guide screen 90. The pivot 95 defines an axis which extends substantially parallel to the more or less vertical axis of the shaft 15. The fixed portion 94 of the bracket and the fixed portion 91 of the guide screen 90 which it carries subtend an angle 82 (FIG. 7) at the axis of the shaft 15 and the pivotable portion 93 of said bracket subtends, together with the movable portion 92 of said screen, an angle 84 (FIG. 7) at the axis of the shaft 15 when turned about the pivot 95 from the illustrated inoperative position into an operative position. As can be seen in FIG. 8 of the drawings, a retaining rod 96 has its downwardly bent-over end entered through a hole in the pivotable portion 93 of the bracket to retain the movable portion 92 of the guide screen in the illustrated inoperative position in which it is behind the fixed portion 91 of the guide screen when viewed from the shaft 15. The bent-over end of the rod 96 is entered through a hole in the fixed portion 94 of the bracket when the movable portion 92 of the guide screen 90 occupies its operative position. The end 97 of the pivotable portion 93 of the bracket that is remote from the pivot 95 carries a simple clamp 98 to enable it to be releasably secured to the uppermost edge of the hopper 29 when a distribution spectrum similar to that illustrated in FIG. 4 is desired for the material spread by the implement. When the movable portion 92 is folded back as shown in FIG. 8 of the drawings, a distribution spectrum similar to that illustrated in FIG. 6 is obtained because the angle 71 (FIG. 5) is some 10° to 15° smaller in magnitude than the angle enclosed between the line 64 (FIG. 2) and the plane 57 or line 101. This allows some of the ejected material to pass by the guide screen without hindrance.

Although all of the spreading members 34 that have been described rotate in the anticlockwise direction D as seen in plan view, it will be self-evident that an opposite direction of rotation could be employed in which case guide screens should be used that are symmetrically opposite in construction with respect to the plane 57. An example of this can, of course, be seen in the case of the dual implement of FIG. 1 where the guide screen 36 and rail-like bracket 37 associated with the spreading portion 9 are symmetrical to those associated with the spreading portion 10.

Having thus described my invention, what I claim as new and desire to secure by Letters Patent of the United States is:

1. A spreading implement comprising a transportable frame, with a hopper and a rotary spreader being supported on said frame, said hopper having outlet means adjacent the bottom thereof and said spreader being positioned below said outlet means, a guide screen having concave surfaces being located adjacent said spreader generally to the rear thereof to arrest the movements of ejected material, said screen being partly positioned in the spreading spectrum defined by material normally ejected by said spreader with the distance between said concave surfaces and the axis of rotation of said spreader being varied, whereby said distance decreases in the direction of rotation of said spreader when the same is viewed in top plan.

2. An implement as claimed in claim 1, wherein at least part of the spreading spectrum of said spreader is surrounded by said guide screen and the latter is comprised of a shock-absorbent material.

3. An implement as claimed in claim in claim 2, wherein said material is a synthetic plastics foam.

4. An implement as claimed in claim 1, wherein the maximum distance between said guide screen and the axis of rotation of said spreader is not greater than three times the minimum distance between said screen and said axis.

5. An implement as claimed in claim 1, wherein the maximum distance between said guide screen and the axis of rotation of the spreader is not greater than 150 centimeters.

6. An implement as claimed in claim 1, wherein the concave surfaces of the guide screen occupies a substantially fixed angular setting around the axis of rotation of said spreader and said surfaces are positioned in only that spectrum around said axis into which material is normally ejected by said spreader during operation.

7. An implement as claimed in claim 6, wherein a portion of said guide screen is located a distance from the axis of rotation of said spreader and said distance decreases along its length at a point approximately halfway around the axis of rotation from a line extending forwardly from that axis in the normal direction of travel.

8. An implement as claimed in claim 1, wherein a radial line extending from the axis of rotation of said spreader through the center of an opening of said outlet means is inclined at an angle of about 70° to a further radial line passing through that end of said guide screen which is foremost with respect to the direction of rotation of said spreader.

9. An implement as claimed in claim 1, wherein a radial line extending from the axis of rotation of said spreader through the center of an opening of said outlet means is inclined at an angle of about 70° to a further radial line passing through that point of said guide screen which is at the greatest distance from the axis of rotation of said spreader.

10. An implement as claimed in claim 9, wherein said point on the guide screen is located at a distance from the axis of rotation of said spreader that is not less than twice and not more than four times the effective radius of the spreader.

11. An implement as claimed in claim 10, wherein said distance is about 2½ times the effective radius of said spreader.

12. An implement as claimed in claim 1, wherein said spreader includes a disc on a substantially vertical shaft and that portion of said guide screen, which is located nearest to the axis of rotation of said spreader, is spaced from that axis by a distance less than twice the effective radius of said disc.

13. An implement as claimed in claim 1, wherein a portion of said guide screen is located a distance from the axis of rotation of said spreader which distance decreases along its length and subtends an angle of approximately 70° at said axis of rotation, said guide screen also including a further portion with a concave surface curved so that its center of curvature is substantially coincident with said axis of rotation.

14. A spreading implement comprising a transportable frame, with a hopper and a rotary spreader being supported on said frame, said hopper having outlet means adjacent the bottom thereof and said outlet means being positioned in a predetermined place relative to the axis of rotation of the spreader in such a way that during operation of the device the material is spread out over only an angular sector, said spreader being positioned below said outlet means, a guide screen having concave surfaces being supported on said implement and located adjacent said spreader generally to the rear thereof relative to the direction of travel, said screen extending over said angular sector to arrest the movements of ejected material, the distance between said concave surfaces and the axis of rotation of said spreader being varied, whereby the maximum distance of said concave surfaces to the axis of rotation of the spreader is not greater than two and a half times the distance between the outer circumference of the spreader and its axis of rotation.

15. A spreading implement comprising a transportable frame, with a hopper and a rotary spreader being mounted on said frame, said spreader being located below said hopper and adjustable outlet means in said hopper for metering material to said spreader, said outlet means being adjustably positioned relative to the axis of rotation of the spreader whereby, during operation, material is spread out to be concentrated over a selected angular sector, guide means supported on a bracket connected to said frame, to present concave surfaces that surround at least a portion of said rotary spreader, said guide means comprising a screen extending over at least part of the selected angular sector to arrest the movement of controlled amounts of material ejected by said spreader, thereby allowing the material to fall by gravity to the ground in a predetermined spectrum and concentration, a first portion of said guide screen being detachable from said bracket and securing means associated with said bracket to retain said first portion at a second position in back of a second portion of said guide screen.

16. An implement as claimed in claim 15, wherein said outlet means comprises an outlet port in the bottom of said hopper and control discs, each with outlet openings that can be placed in register with said port, said discs being located between said hopper and said spreader.

17. An implement as claimed in claim 15, wherein said second portion is connectable to said bracket by a readily detachable fastening member on said bracket.

18. An implement as claimed in claim 15, wherein said first portion of the guide screen is pivotally connected to said second portion which is fixed to said bracket.

19. An implement as claimed in claim 18, wherein said first portion is turnable relative to said second portion about a pivot whose axis extends substantially parallel to the axis of rotation of said spreader.

20. An implement as claimed in claim 15, wherein said first portion is connected to said second portion at a point which is at a maximum distance from the axis of rotation of said spreader, said guide screen being positioned whereby the distance between said axis and the screen progressively decreases in both directions when seen in top plan view.

21. An implement as claimed in claim 15, wherein the first portion of said guide screen has one of its ends located adjacent to, a radial line which, in plan view, passes through the axis of rotation of said spreader and through said outlet means.

22. An implement as claimed in claim 15, wherein said guide screen has a length of not more than 2 meters.

23. An implement as claimed in claim 15, wherein the length of said guide screen is less than about 1 meter.

24. A spreading implement comprising a transportable frame, with a hopper and a rotary spreader being mounted on said frame, said spreader being located below said hopper and adjustable outlet means in said hopper for metering material to said spreader, said outlet means being adjustably positioned relative to the axis of rotation of the spreader whereby, during operation, material is spread out to be concentrated over a selected angular sector, guide means supported on said implement to present concave surfaces that surround at least a portion of said rotary spreader, said guide means extending over at least part of the selected angular sector to arrest the movement of controlled amounts of material ejected by said spreader, thereby allowing the material to fall by gravity to the ground in a predetermined spectrum and concentration, said guide means comprising a guide screen, the area of which is adjustable to present more or less concave surfaces adjacent said spreader.

25. A spreading implement comprising a transportable frame, with a hopper and a rotary spreader being mounted on said frame, said spreader being located below said hopper and adjustable outlet means in said hopper for metering material to said spreader, said outlet means being adjustably positioned relative to the axis of rotation of the spreader whereby, during operation, material is spread out to be concentrated over a selected angular sector, guide means supported on said implement to present concave surfaces that surround at least a portion of said rotary spreader, said guide means extending over the selected angular sector to arrest the movement of controlled amounts of material ejected by said spreader, thereby allowing the material to fall by gravity to the ground in a predetermined spectrum and concentration, the distance between said concave surfaces and the axis of rotation of said spreader being varied, said guide means comprising a screen positioned to surround a portion of said spreader whereby the trajectory of particles of ejected material intercepted by said screen are at angles of 45° – 135° relative to tangents to said screen at the points of impact.

26. An implement as claimed in claim 25, wherein said guide screen subtends a maximum angle of about 240° at the axis of rotation of said spreader and one end of said guide screen is located adjacent a radial line extending from said axis through the center of said outlet port.

27. An implement as claimed in claim 25, wherein the lowermost edge of said guide screen is located at a distance above ground level which is not more than half the distance of said spreader above the ground.

28. An implement as claimed in claim 25, wherein, not less than about half the height of said guide screen is located above said spreader.

29. An implement as claimed in claim 28, wherein said guide screen is fastened to said implement adjacent the upper rim of said hopper and the latter is located directly over and above said spreader.

30. A spreading implement comprising a transportable frame, with a hopper and a rotary spreader being mounted on said frame, said spreader being located below said hopper and outlet means with at least one outlet opening being provided in the lower end of the hopper for metering material from said hopper to said spreader, said outlet means being positioned in a predetermined place relative to the axis of rotation of the spreader whereby material is spread out over only an angular sector, guide means supported on said implement to present concave surfaces that surround at least a portion of said rotary spreader, said guide means extending at least substantially over the selected angular sector to arrest the movement of ejected material, the distance between said concave surfaces and the axis of rotation of said spreader being varied, a radial line extending from the axis of rotation of said spreader through said outlet opening being inclined at an angle of about 70° to a further radial line passing through that point of said guide means which is at the greatest distance from the axis of rotation of said spreader.

31. A spreading implement comprising a transportable frame, with a hopper and a rotary spreader being mounted on said frame, said spreader being located below said hopper and outlet means with at least one outlet opening being provided in the lower end of the hopper for metering material to said spreader, during operation of the device said outlet means being positioned in a predetermined place relative to the axis of rotation of the spreader whereby material ejected from said spreader is spread out over only an angular sector, guide means supported on said implement to present concave surfaces that surround at least a portion of said rotary spreader, said guide means extending at least substantially over the selected angular sector to arrest the movement of ejected material, the distance between said concave surfaces and the axis of rotation of said spreader being varied, that area of said surface on said guide means which is most distal from the axis of rotation of said spreader being angularly spaced from a radial line extending from the axis of rotation of said spreader through said outlet opening, at least part of said concave surfaces extending around the spreader from said most distal area of the guide means in the direction of rotation of said spreading member, whereby the distance between at least a portion of said part of the concave surfaces and said axis of rotation decreases as seen in the direction of rotation of said spreader.

32. An implement as claimed in claim 24, wherein said guide screen is supported on bracket means attached to said frame and an upper bracket of said bracket means effects a connection between said screen and said hopper.

33. An implement as claimed in claim 32, wherein said upper bracket is connected to said hopper at three substantially equally spaced-apart points.

34. An implement as claimed in claim 32, wherein a lower bracket of said bracket means is spaced from the ground by a distance of not more than about 10 centimeters.

35. An implement as claimed in claim 34, wherein at least one stiffening element extends between said upper and lower brackets to increase the rigidity of said screen.

36. An implement as claimed in claim 35, wherein said stiffening element is resilient to permit upward and lateral deflections of said lower bracket relative to said upper bracket.

* * * * *